(12) United States Patent
Peleg

(10) Patent No.: US 8,619,816 B2
(45) Date of Patent: Dec. 31, 2013

(54) METHOD AND CORRESPONDING DEVICE FOR IMPROVED BANDWIDTH UTILIZATION

(75) Inventor: Yaron Menahem Peleg, Tel-Aviv (IL)

(73) Assignee: Go Net Systems Ltd., Tel Aviv (IL)

( * ) Notice: Subject to any disclaimer, the term of this patent is extended or adjusted under 35 U.S.C. 154(b) by 878 days.

(21) Appl. No.: 11/436,565

(22) Filed: May 19, 2006

(65) Prior Publication Data

US 2006/0262766 A1 Nov. 23, 2006

Related U.S. Application Data

(60) Provisional application No. 60/682,819, filed on May 20, 2005.

(51) Int. Cl.
*H04J 3/24* (2006.01)
*H04W 4/00* (2009.01)

(52) U.S. Cl.
USPC .......................................... 370/474; 370/338

(58) Field of Classification Search
USPC ............ 370/470–474, 393, 458, 338; 398/54; 701/33
See application file for complete search history.

(56) References Cited

U.S. PATENT DOCUMENTS

| | | | |
|---|---|---|---|
| 6,389,038 B1 * | 5/2002 | Goldberg et al. | 370/471 |
| 6,438,123 B1 | 8/2002 | Chapman | |
| 6,560,223 B1 | 5/2003 | Egan et al. | |
| 6,594,280 B1 | 7/2003 | Chapman | |
| 6,665,495 B1 * | 12/2003 | Miles et al. | 398/54 |
| 6,785,513 B1 | 8/2004 | Sivaprakasam | |
| 6,920,125 B1 | 7/2005 | Wu | |
| 6,931,512 B2 | 8/2005 | Dillon | |
| 6,950,628 B1 | 9/2005 | Meier | |
| 7,002,995 B2 | 2/2006 | Chow | |
| 7,010,002 B2 | 3/2006 | Chow | |
| 7,257,131 B2 * | 8/2007 | Smith | 370/466 |
| 2002/0018471 A1 * | 2/2002 | Shpak | 370/393 |
| 2002/0160806 A1 | 10/2002 | Arazi | |
| 2003/0033394 A1 | 2/2003 | Stine | |
| 2003/0123476 A1 * | 7/2003 | Shenoi | 370/458 |
| 2003/0149772 A1 | 8/2003 | Hsu | |
| 2003/0220112 A1 | 11/2003 | Bugeja | |
| 2004/0009749 A1 | 1/2004 | Arazi | |
| 2004/0039817 A1 | 2/2004 | Lee | |
| 2004/0049570 A1 | 3/2004 | Frank | |
| 2004/0051664 A1 | 3/2004 | Frank | |
| 2004/0053624 A1 | 3/2004 | Frank | |
| 2004/0078468 A1 | 4/2004 | Hedin | |
| 2004/0121749 A1 | 6/2004 | Cui | |
| 2004/0165555 A1 | 8/2004 | Backes | |
| 2004/0166871 A1 | 8/2004 | Backes | |
| 2004/0192325 A1 | 9/2004 | Backes | |
| 2004/0203688 A1 | 10/2004 | Backes | |
| 2004/0224637 A1 | 11/2004 | Silva | |
| 2005/0058125 A1 | 3/2005 | Mutikainen | |
| 2005/0060319 A1 | 3/2005 | Douglas | |

(Continued)

*Primary Examiner* — Gbemileke Onamuti
(74) *Attorney, Agent, or Firm* — Vladimir Sherman; Professional Patent Solutions

(57) ABSTRACT

Method and corresponding device for improved bandwidth utilization featuring optimized transmission of information packets on a backhaul connection, by concatenating a few VoIP packets into a big packet with optional internal header compression. The concatenated packets are transmitted efficiently through the backhaul channel and rearranged at the receiving side. In an embodiment of the present invention, compression is applied to the concatenated packets featuring the most waste.

21 Claims, 1 Drawing Sheet

(56) References Cited

U.S. PATENT DOCUMENTS

| | | |
|---|---|---|
| 2005/0066040 A1 | 3/2005 | Borella |
| 2005/0073981 A1 | 4/2005 | Banerjee |
| 2005/0111403 A1 | 5/2005 | Rudolf |
| 2005/0122999 A1 | 6/2005 | Scherzer |
| 2005/0171662 A1* | 8/2005 | Strege et al. ............... 701/33 |
| 2005/0192037 A1* | 9/2005 | Nanda et al. ............... 455/509 |
| 2005/0195858 A1* | 9/2005 | Nishibayashi et al. ....... 370/474 |
| 2005/0226228 A1 | 10/2005 | Dowling |
| 2005/0232179 A1 | 10/2005 | daCosta |
| 2005/0243746 A1 | 11/2005 | Mutikainen |
| 2006/0009232 A1 | 1/2006 | Vakil |
| 2006/0039353 A1 | 2/2006 | Samuel |
| 2006/0056442 A1 | 3/2006 | DaCosta |
| 2007/0195820 A1* | 8/2007 | So et al. ............... 370/470 |

\* cited by examiner

METHOD AND CORRESPONDING DEVICE FOR IMPROVED BANDWIDTH UTILIZATION

REFERENCE TO RELATED APPLICATION

This application claims benefit and priority from U.S. Provisional Patent Application No. 60/682,819, filed May 20, 2005, which is incorporated herein by reference.

FIELD AND BACKGROUND OF THE INVENTION

The present invention relates to communication networks, and more particularly, to a method and corresponding device for improved bandwidth utilization featuring optimized transmission of information packets on a backhaul connection, by concatenating a few VoIP packets into a unified packet with optional internal header compression. The concatenated packets are transmitted efficiently through the backhaul channel and rearranged at the receiving side. In an embodiment option of the present invention, compression is applied to the concatenated packets featuring the most waste.

To date, the inventor is unaware of prior art teaching a method and corresponding device for concatenating packets featuring a time limit.

There is thus a need for, and it would be highly advantageous to have a method and corresponding device for improved bandwidth utilization featuring optimized transmission of information packets on a backhaul connection by concatenating a few VoIP packets into a super packet.

SUMMARY OF THE INVENTION

The present invention relates to communication networks, and more particularly, to a method and corresponding device for improved bandwidth utilization featuring optimized transmission of information packets on a backhaul connection, by concatenating a few VoIP packets into a big packet with optional internal header compression. The concatenated packets are transmitted efficiently through the backhaul channel and rearranged at the receiving side. In an embodiment option of the present invention, compression is applied to the concatenated packets featuring the most waste.

Thus, according to the present invention, there is provided a method for backhaul connection including: (a) setting the backhaul connection between a backhaul source and a backhaul destination, (b) receiving a packet or frame at the backhaul source, (c) adding the received packet to an available super-packet; if there is no available super-packet, creating a new super-packet and setting a transmission condition for transmitting the super-packet, (d) transmitting the super-packet according to the transmission condition, and (e) receiving and handling the super-packet at the backhaul destination.

According to further features in preferred embodiments of the present invention, the method further includes the step of deciding whether to concatenate the received packet or transmit the received packet without concatenation.

According to still further features in the described preferred embodiments, the performance of a user that transmitted the packet is an input parameter to the step of deciding whether to concatenate the received packet.

According to still further features in the described preferred embodiments, the performance of the user includes identifying streaming packets and identifying the frequency at which the user should transmit his packets.

According to still further features in the described preferred embodiments, the performance of the user includes calculating the received jitter and packet loss.

According to still further features in the described preferred embodiments, the multiple super-packets are prepared by the backhaul source in parallel.

According to still further features in the described preferred embodiments, the received packet is added to the super-packet according to at least one of the following parameters: traffic type, sensitivity to delay, or QoS.

According to still further features in the described preferred embodiments, the transmission condition includes at least one of the following: maximum size of the super-packet, maximum delay for the super-packet, or maximum number of users.

According to still further features in the described preferred embodiments, the transmission condition includes a maximum delay condition.

According to still further features in the described preferred embodiments, the maximum delay condition starts when a new packet is received at the backhaul source.

According to still further features in the described preferred embodiments, the maximum delay condition is calculated according to a need of a delay-sensitive application.

According to still further features in the described preferred embodiments, the transmission condition includes a maximum delay condition for the transmission of the super-packet and the maximum delay condition is calculated according to at least one of the following: network performance, measured jitter, measured delay, measured packet loss, user's priority, type of application running, transmission rate, number of retransmissions, hidden stations, or collisions.

According to still further features in the described preferred embodiments, the transmission condition includes a maximum delay condition for the transmission of the super-packet and the maximum delay condition is calculated according to at least one of the following: the measured performance of a link, transmissions rate, number of retransmission, RSSI, or average packet loss.

According to still further features in the described preferred embodiments, the method further includes forwarding the received packet to an external device, whereby the external device adds the received packet to the available super-packet or creates the new super-packet.

According to still further features in the described preferred embodiments, the at least two of the received packets are transmitted by streaming users, and the streaming users are synchronized.

According to still further features in the described preferred embodiments, the method further includes reordering the packets in the super-packet.

According to still further features in the described preferred embodiments, the super-packet is compressed.

According to another aspect of the present invention, there is provided a method for backhaul connection including: (a) receiving a packet or frame at a backhaul source for a required backhaul destination, (b) adding the received packet to an available super-packet for the required backhaul destination; if there is no available super-packet for the required backhaul destination, creating a new super-packet and setting a transmission condition for transmitting the super-packet, (c) transmitting the super-packet according to the transmission condition, and, (d) receiving and handling the super-packet at the backhaul destination.

According to further features in preferred embodiments of the present invention, the method further includes checking if the required destination can receive and handle super-packets.

According to still further features in the described preferred embodiments, the method further includes calculating if it is beneficial to concatenate the received packet.

According to still further features in the described preferred embodiments, the multiple super-packets are prepared in parallel.

According to still further features in the described preferred embodiments, the received packet is added to the super-packet according to at least one of the following parameters: traffic type, sensitivity to delay, or QoS.

According to still further features in the described preferred embodiments, the method further includes forwarding the received packet to an external device, and the external device adds the received packet to the available super-packet or creates the new super-packet.

According to still further features in the described preferred embodiments, the at least two of the received packets are transmitted by streaming users, and the streaming users are synchronized.

According to still further features in the described preferred embodiments, the transmission conditions includes a maximum delay condition.

According to still further features in the described preferred embodiments, counting the maximum delay condition starts when a new packet is received at the backhaul source.

According to still further features in the described preferred embodiments, the maximum delay condition is calculated according to a need of a delay-sensitive application.

According to still further features in the described preferred embodiments, the transmission conditions include a maximum delay condition for the transmission of the super-packet and the maximum delay condition is calculated according to at least one of the following: network performance, measured jitter, measured delay, measured packet loss, user's priority, type of application running, transmission rate, number of retransmissions, hidden stations, or collisions.

According to still further features in the described preferred embodiments, the transmission conditions include a maximum delay condition for the transmission of the super-packet and the maximum delay condition is calculated according to at least one of the following: the measured performance of a link, transmissions rate, number of retransmission, RSSI, or average packet loss.

According to another aspect of the present invention, there is provided a tunneling device for a backhaul connection including: (a) input and output for receiving and transmitting packets, (b) packet concatenation device, and (c) transmission decision logic, whereby the transmission decision logic determines when a super-packet is to be transmitted.

According to further features in preferred embodiments of the present invention, the transmission decision logic includes a counter.

According to still further features in the described preferred embodiments, the packet concatenation device further includes a packet analyzer.

According to still further features in the described preferred embodiments, the device further includes a user synchronization device.

According to still further features in the described preferred embodiments, the device further includes a user type identifier.

Implementation of the method and corresponding device for improved bandwidth utilization of the present invention involves performing or completing selected tasks or steps manually, semi-automatically, fully automatically, and/or, a combination thereof. Moreover, according to actual instrumentation and/or equipment used for implementing a particular preferred embodiment of the disclosed method and corresponding device, several selected steps of the present invention could be performed by hardware, by software on any operating system of any firmware, or a combination thereof. In particular, regarding hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, regarding software, selected steps of the invention could be performed by a data processor, such as a computing platform, executing a plurality of computer program types of software instructions or protocols using any suitable computer operating system.

BRIEF DESCRIPTION OF THE DRAWINGS

The present invention is herein described, by way of example only, with reference to the accompanying drawings. With specific reference now to the drawings, it is stressed that the particulars shown are by way of example and for purposes of illustrative discussion of the preferred embodiments of the present invention only, and are presented in order to providing what is believed to be the most useful and readily understood description of the principles and conceptual aspects of the present invention. In this regard, no attempt is made to show structural details of the present invention in more detail than is necessary for a fundamental understanding of the invention, the description taken with the drawings makes apparent to those skilled in the art how the several forms of the invention may be embodied in practice. Identical structures, elements or parts which appear in more than one figure are preferably labeled with a same or similar number in all the figures in which they appear. In the drawings.

DESCRIPTION OF THE PREFERRED EMBODIMENTS

Figure 1:
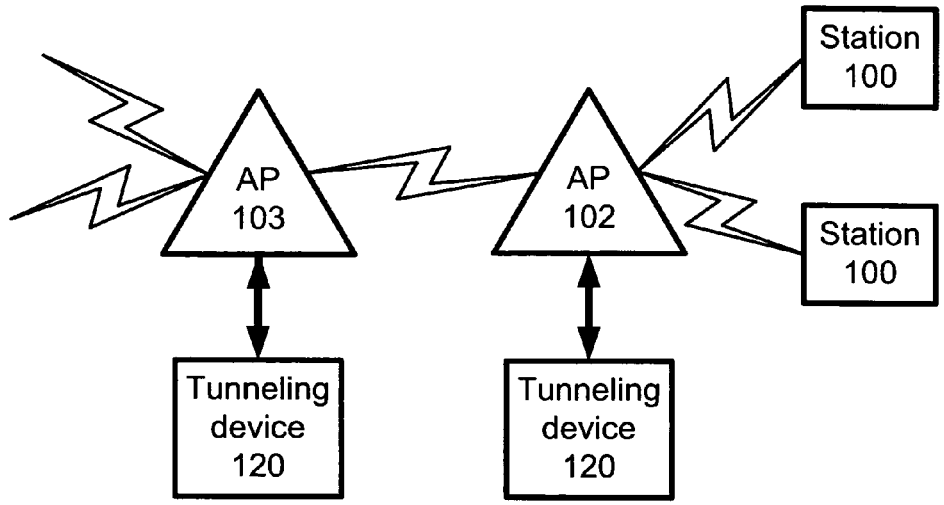
FIG. 1 is a schematic diagram illustrating an exemplary preferred embodiment of the tunneling system, in accordance with the present invention.

The present invention relates to communication networks, and more particularly, to a method and corresponding device for improved bandwidth utilization featuring optimized transmission of information packets on a backhaul connection, by concatenating a few VoIP packets into a big packet with optional internal header compression. The concatenated packets are transmitted efficiently through the backhaul channel and rearranged at the receiving side. In an embodiment option of the present invention, compression is applied to the concatenated packets featuring the most waste.

The present invention is a method and corresponding device for improved bandwidth utilization. The preferred embodiments of the present invention are discussed in detail below. It is to be understood that the present invention is not limited in its application to the details of the order or sequence of steps of operation or implementation of the method set forth in the following description, drawings, or examples. While specific steps, configurations and arrangements are discussed, it is to be understood that this is done for illustrative purposes only. A person skilled in the relevant art will recognize that other steps, configurations and arrangements can be used without departing from the spirit and scope of the present invention.

Each primary step, and additional steps, needed for enabling the use of this method and corresponding device for improved bandwidth utilization are described in the following detailed description.

Wireless communication systems handle different sized information packets transmitted at different frequency transmission rates. While the size, type, structure, and frequency of transmissions may vary on the wireless communication system, the number of separate transmissions, especially on a non-synchronized wireless network, affects the performance significantly. Moreover, for small-sized data packets that are frequently used by streaming applications, the transmitted frame length is disproportionally large compared to the data size, thereby occupying a larger than normal amount of bandwidth.

By implementing the following novel method, the present invention concatenates a plurality of packets/frames into a super-packet/super-frame, and thereby significantly improves bandwidth utilization.

Setting a backhaul connection.

Exemplary types of backhaul connections that may be used with the present invention are automatic backhaul connections, manual backhaul connections, backhaul connections according to the link (PTP/PTMP), mesh type backhaul connections, and backhaul connection aggregations, optionally by learning the network dynamically.

Without limiting the scope of the present invention, the backhaul connection may be implemented between the following network elements: access points, base stations, switches, routers, tunneling devices and other appropriate elements.

It is to be understood that the backhaul connection of the present invention may be set over Open System Interconnection (OSI) layer 2 or over OSI layer 3, without limiting the scope of the present invention. In the case where the backhaul connection is set over OSI layer 2, super-frames are transmitted. In the case where the backhaul connection is set over OSI layer 3, super-packets are transmitted. For the sake of simplicity, most of the description of the present invention is phrased in terms of packets, but it is to be understood that all steps are applicable to frames as well. One should take into account the equivalence between packets and frames when interpreting the scope of the present invention.

Moreover, a system in accordance with the present invention can operate, simultaneously, backhaul connections over OSI layer 2 and backhaul connections over OSI layer 3, depending on the tunnel, type of equipment, and the devices on both sides of the connections.

Receiving a packet at a backhaul source.

The packet is received as known in the art.

Optionally, decide whether to concatenate the received packet.

All, some or none of the received packets may be tunneled. In an embodiment of the present invention, the performance of the user sending the packets is measured and/or estimated.

Optionally, the users performance is one of the input parameters to the algorithm deciding whether and how to build a super-packet (or, equivalently, a super-frame). According to the performance of the specific users, the tunneling device decides when to transmit a super-packet, in order to keep the total performance above a minimum required performance level. For example, if the measured performance of the user is below a threshold, no concatenation is to be performed. The performance of the users sending the packets may be measured by using one or more of the following exemplary methods:

(a) A tunneling device identifies streaming packets and identifies the frequency at which a station should transmit its packets, for example every 20 mili-seconds. Alternatively, the tunneling device identifies streaming packets and extracts the required information from within the packets.

(b) Measuring the time stamp of each frame from each user. From the measured time, the received jitter and packet loss are calculated.

(c) The packet loss of a user is calculated by one or more of the following methods: (1) reading the time stamp and sequence number from the Real Time Protocol (RTP). When the received packets numbers are not consecutive, it is an indication that there was a packet loss. (2) Using statistical calculations, for example deviation from a packet each 20 mili second. In this case it is important to be aware of the possible existence of a Voice Activity Detection (VAD) mechanism. (3) Using Real Time Control Protocol (RTCP) information.

In the case of a non point-to-point backhaul connection, the header and packet payload are analyzed in order to check: (a) If there is a backhaul destination that can receive and handle a super packet. (b) Optionally, check if it is beneficial to concatenate the packet.

In the case where there is a backhaul destination that can receive and handle a super packet, the network topology is learned. Similarly to a switch or a router, the tunneling device learns the destinations which are associated with the destination point-to-multi-point link. As a result, the relevant destinations may be used for concatenation. According to the packet type, the packet size, and link characteristics, the concatenation algorithm decides whether or not to perform concatenation.

Alternatively, in the case of a point-to-point (PTP) backhaul connection, the packet type, packet size, number of active destinations, QoS, and performance, are analyzed in order to decide whether to concatenate the packet or not. It is to be noted that it is possible for the tunneling device/algorithm to decide to concatenate only some of the packets. For example, the device may decide to concatenate only streaming packets, such as VoIP, and not concatenate other types of packets).

Additionally or alternatively, one or more of the following exemplary packet parameters may be analyzed: user profile, required QoS, application type, source properties, packet destination, and/or user performance.

It is to be understood that the backhaul may be only to one direction, and may be encrypted.

Adding the received packet to an available or new super-packet.

If there is an available super-packet to the required destination, add the received packet. If there is no available super packet, create a new super packet. Note that for a point-to-point connection there is only a need to check whether there is an available super-packet.

When creating a new super-packet, setting a transmission condition for transmitting the super-packet.

Optionally, the transmission condition is a maximum delay. Optionally, the maximum allowed delay calculation receives at least one of the following inputs: the measured performance of the link, transmissions rate, number of retransmission, RSSI, and average packet loss.

In an alternative embodiment, multiple super-packets are prepared in parallel, optionally according to at least one of the following parameters: traffic type, sensitivity to delay, and QoS.

Preparing multiple super-packets in parallel features the following benefits: as the super-packet is longer, the bandwidth usage is improved, but at the expense of increasing the delay; It is to be noted that delay sensitive traffic, such as VoIP, cannot be delayed for long, but video and one directional VoIP can be delayed and therefore may have a longer packet.

There may be applications where the packets are divided/duplicated between at least two super packets.

Alternatively, more than one backhaul connection is created to more than one destination. The backhaul connection may have the following exemplary architectures:

(a) Mesh architecture that provides dynamic, automatic, and easy system installation. Mesh architecture features high wireless backhaul and fault tolerance, i.e. if a link falls, it is possible to use another link. For example, a connection may be created between any two APs in mesh architecture, so that if the link between AP1 and AP2 falls, it is possible for AP1 to communicate with AP2 through AP3.

(b) Star architecture between APs featuring wireless inputs and outputs and an AP that has an Ethernet connection.

If an appropriate super-packet is already available, the packet is added to the appropriate super-packet.

Usually, it is not important to where in the super-packet the packet is added, because the entire super-packet gets CRC and decoded.

Optionally, not all packets are transmitted. Alternatively, the packets are reordered in the super-packet.

The super-packet may be compressed or not compressed. Moreover, specific packets inside the super-packet may be compressed. Optionally, different compressions are used, such as different types of header compressions, payload compression, etc.

In a preferred embodiment of the present invention, the following parameters are the main parameters relevant for building super-packets: maximum size of a super-packet; Maximum delay allowed for a super-packet; Maximum number of users. For example, no more than 10 users per super-packet; And method of transmitting the super-packet. The concatenation algorithm may take into account one or more of the following parameters: rate, retransmission, QoS, and the ability to assign different priorities to different super-packets.

Transmitting the super-packet before or when its transmission condition is fulfilled.

The time to transmit the super-packet may be set dynamically based on the following parameters: network performance; measured jitter; measured delay; measured packet loss; user's priority; type of application running; transmission rate; number of retransmissions; hidden stations; and collisions.

The super-packet may be transmitted earlier than planned due to various reasons, such as measured performance, performance of a specific user, and a decision to give up the concatenation and transmit the packet as it is.

The super-packet transmission may be canceled, for example, due to a transmission failure.

The concatenation may be performed using an external device.

Figure 2:
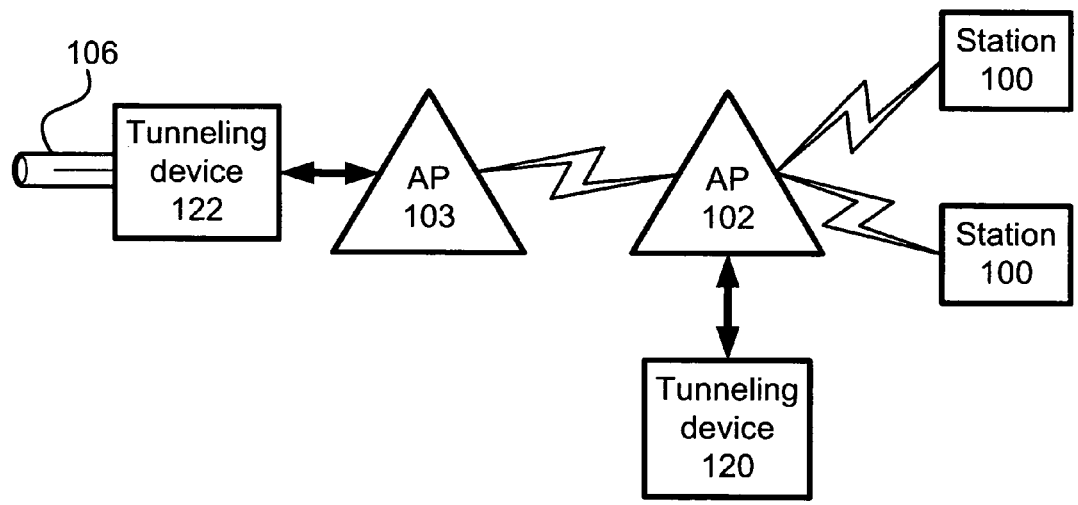
FIG. 2 is a schematic diagram illustrating another exemplary preferred embodiment of the tunneling system, in accordance with the present invention.

FIG. 1 illustrates external tunneling devices 120 connected in parallel with AP 102 and AP 103. FIG. 2 illustrates external tunneling device 122 serially connected to AP 102 and AP 103. As illustrated in FIG. 2, serially connected external tunneling device 122 that performs the tunneling is placed on the Ethernet side.

In the case where the receiving sides of AP 102 and AP 103 are not connected to an Ethernet, as illustrated in FIG. 1, the APs are unable to create or open super-packets. Therefore, in order to create a super-packet, the AP transmits the packets through its Ethernet output to tunneling device 120, and tunneling device 120 creates the super-packet and sends the super-packet back to the AP, which transmits the super-packet to its client. On the uplink channel, the packets from the stations are directed to tunneling device 120 and not to the appropriate AP. Therefore tunneling device 120 acts as the default router, concatenates the packets and transmits the super-packet through the AP. Opening a super-packet is similarly performed by tunneling device 120.

The backhaul destination receives and opens the super-packet.

The backhaul destination may open the super-packet by itself or by using external equipment.

Optionally, synchronizing streaming users that transmit to the tunneling device.

Streaming users, such as VOIP and video over IP, transmit with constant delay. As the various users are more synchronized, the delay decreases and the wireless network performance is improved. The users may be synchronized by using a variety of methods, and/or by any appropriate mechanism, without limiting the scope of the present invention. For example, a proprietary synchronization mechanism that sends synchronization signals to all users may be used; or the tunneling device may transmit synchronization signals to the appropriate users; or a central network manager may synchronize the various users. The synchronization signal causes the packets to arrive at the tunneling device approximately at the same time.

Synchronizing the creation time of a super-packet with the time of arrival of the packets to be concatenated.

In order to achieve as little delay as possible, the delay calculation begins when a new packet is received at the tunneling device and not when the handling of the previous super-packet is completed. Alternatively, the delay is calculated according to the needs of a delay-sensitive application. For example, a radio packet that arrives first at the tunneling device may not start the delay counter. It is to be noted that it may be possible for the same station to run several applications while the tunneling device may be concerned only with the most delay-sensitive applications.

As previously mentioned, it is to be understood that the backhaul connection of the present invention may be set over Open System Interconnection (OSI) layer 2 or over OSI layer 3, without limiting the scope of the present invention. In the case where the backhaul connection is set over OSI layer 2, super-frames are transmitted. In the case where the backhaul connection is set over OSI layer 3, super-packets are transmitted. For the sake of simplicity, most of the description of the present invention is phrased in terms of packets, but it is to be understood that all steps are applicable to frames as well. One should take into account the equivalence between packets and frames when interpreting the scope of the present invention.

The method of the present invention may be implemented by using any appropriate tunneling device.

For example, a tunneling device for a backhaul connection includes: (a) input and output for receiving and transmitting packets, (b) a packet concatenation device, and (c) transmission decision logic, for determining when a super-packet is to be transmitted. The tunneling device for a backhaul connection may further include the following optional elements: (a) a counter in the transmission decision logic. (b) a packet analyzer in the packet concatenation device. (c) user synchronization device in the tunneling device. (d) a user type identifier in the tunneling device.

What is claimed is:

1. A method for operating a wireless packet-based backhaul connection comprising:
    (a) establishing a backhaul connection, within an asynchronous wireless network, between a backhaul source and a backhaul destination;
    (b) determining that data throughput between the backhaul source and the backhaul destination would be improved by adding the payload data of a packet received at the backhaul source to the payload of a new super-packet generated at the backhaul source for transmission to the backhaul destination, wherein determining throughput would be improved, includes factoring a likelihood of collision with other transmissions within the wireless network;
    (c) generating the new super-packet including at least the data from the received packet, wherein the super-packet is adapted to include payload data from multiple separate packets received at the backhaul source;
    (d) setting one or more transmission conditions for transmitting the new super-packet, wherein one or more of the transmission conditions relate to a payload capacity of the super-packet and quality of service requirements of constituent packets; and
    (e) transmitting the new super-packet upon one or more of the transmission conditions being met.

2. The method of claim 1, further comprising the step of deciding whether to concatenate the received packet or transmit said received packet without concatenation.

3. The method of claim 2, wherein the performance of a user that transmitted said packet is an input parameter to the step of deciding whether to concatenate said received packet.

4. The method of claim 3, wherein measuring said performance of said user comprises identifying streaming packets and identifying the frequency at which said user should transmit its packets.

5. The method of claim 3, wherein measuring said performance of said user comprises calculating the received jitter and packet loss.

6. The method of claim 1, wherein multiple super-packets are prepared by said backhaul source in parallel.

7. The method of claim 6, wherein said received packet is added to said super-packet according to at least one of the following parameters: traffic type, sensitivity to delay, or QoS.

8. The method of claim 1, wherein said transmission condition comprises at least one of the following: a maximum size of said super-packet, a maximum delay for said super-packet, or a maximum number of users.

9. The method of claim 1, wherein said transmission condition comprises a maximum delay condition.

10. The method of claim 9, wherein counting said maximum delay condition starts when a new packet is received at said backhaul source.

11. The method of claim 9, wherein said maximum delay condition is calculated according to a need of a delay-sensitive application.

12. The method of claim 1, wherein said transmission condition comprises a maximum delay condition for the transmission of said super-packet and said maximum delay condition is calculated according to at least one of the following: a network performance, a measured jitter, a measured delay, a measured packet loss, a user's priority, a type of application running, a transmission rate, a number of retransmissions, hidden stations, or collisions.

13. The method of claim 1, wherein said transmission condition comprises a maximum delay condition for the transmission of said super-packet and said maximum delay condition is calculated according to at least one of the following: a measured performance of a link, a transmission rate, a number of retransmissions, RSSI, or an average packet loss.

14. The method of claim 1, wherein at the received packet is transmitted by a streaming user, and said streaming user is synchronized with at least one other streaming user.

15. The method of claim 1, further comprising reordering the packets in said super-packet.

16. The method of claim 1, wherein said super-packet is compressed.

17. A network appliance for wireless backhaul networking comprising:
    (a) an input for receiving a packet to be backhaul transmitted, within an asynchronous wireless network, as part of a super-packet;
    (b) transmission decision logic adapted to determine that data throughput between a backhaul source and a backhaul destination would be improved by adding the payload data of a received packet to the payload of a new super-packet generated at the backhaul source for transmission to the backhaul destination, wherein determining throughput between a backhaul source and a backhaul destination would be improved, includes factoring a likelihood of collision with other transmissions within the wireless network, and further adapted to set one or more transmission conditions for transmitting the new super-packet, wherein one or more of the transmission conditions relate to a payload capacity of the super-packet and quality of service requirements of constituent packets;
    (c) a packet concatenation module for generating the new super-packet including at least the data from the received packet, wherein the super-packet is adapted to include payload data from multiple separate packets received at the backhaul source; and
    (d) a super-packet output adapted to transmit the new super-packet upon one or more of the transmission conditions being met.

18. The networking appliance according to claim 17, wherein said transmission decision logic comprises a counter.

19. The networking appliance according to claim 17, wherein said packet concatenation device further comprises a packet analyzer.

20. The networking appliance according to claim 17, further comprising a user synchronization device.

21. The networking appliance according to claim 17, further comprising a user type identifier.

* * * * *